United States Patent [19]

Weimann et al.

[11] 3,794,890

[45] Feb. 26, 1974

[54] THYRISTOR WITH AMPLIFIED FIRING CURRENT

[75] Inventors: Klaus Weimann, Lampertheim; Elmar Müller, Alzey; Heinz Joachim Baab; Jürgen Pape, both of Lampertheim, all of Germany

[73] Assignee: Brown, Boveri & Company Limited, Baden, Switzerland

[22] Filed: Sept. 14, 1972

[21] Appl. No.: 288,932

[30] Foreign Application Priority Data

Sept. 15, 1971 Germany .................. P 21 46 178.9

[52] U.S. Cl. .. 317/235 R, 317/234 N, 317/235 AB, 317/235 AE, 317/235 AA

[51] Int. Cl. ........................ H01l 15/00, H01l 11/00

[58] Field of Search ........ 317/235, 44, 41.1, 41, 5.4

[56] References Cited

UNITED STATES PATENTS

| | | | |
|---|---|---|---|
| 3,395,320 | 7/1968 | Ansley | 317/235 AE |
| 3,476,989 | 11/1969 | Miles et al. | 317/235 AB |
| 3,549,961 | 12/1970 | Gault | 317/235 AB |
| 3,671,821 | 6/1972 | Nakata et al. | 317/235 AB |
| 3,586,927 | 6/1971 | Roach | 317/235 AB |
| 3,611,066 | 10/1971 | Knaus | 317/235 AB |

*Primary Examiner*—John S. Heyman
*Assistant Examiner*—Andrew J. James
*Attorney, Agent, or Firm*—Pierce, Scheffler & Parker

[57] ABSTRACT

A thyristor structure includes an outer emitter layer of one conductivity type provided with a main electrode and an underlying base layer of opposite conductivity. The emitter layer is provided with a central opening through which small-area contact is made to the base layer to establish a firing current, and surrounding the small-area contact is an annular zone also located within the opening and which exhibits the same type of conductivity as the emitter layer. One or more additional openings are provided in the emitter layer laterally outward of the annular zone and through which small-area contact(s) serving to establish auxiliary firing current is(are) made to the base layer, and the annular zone and said additional small-area contact(s) are linked to each other by way of a conductor without an intermediate barrier layer.

4 Claims, 1 Drawing Figure

PATENTED FEB 26 1974 3,794,890
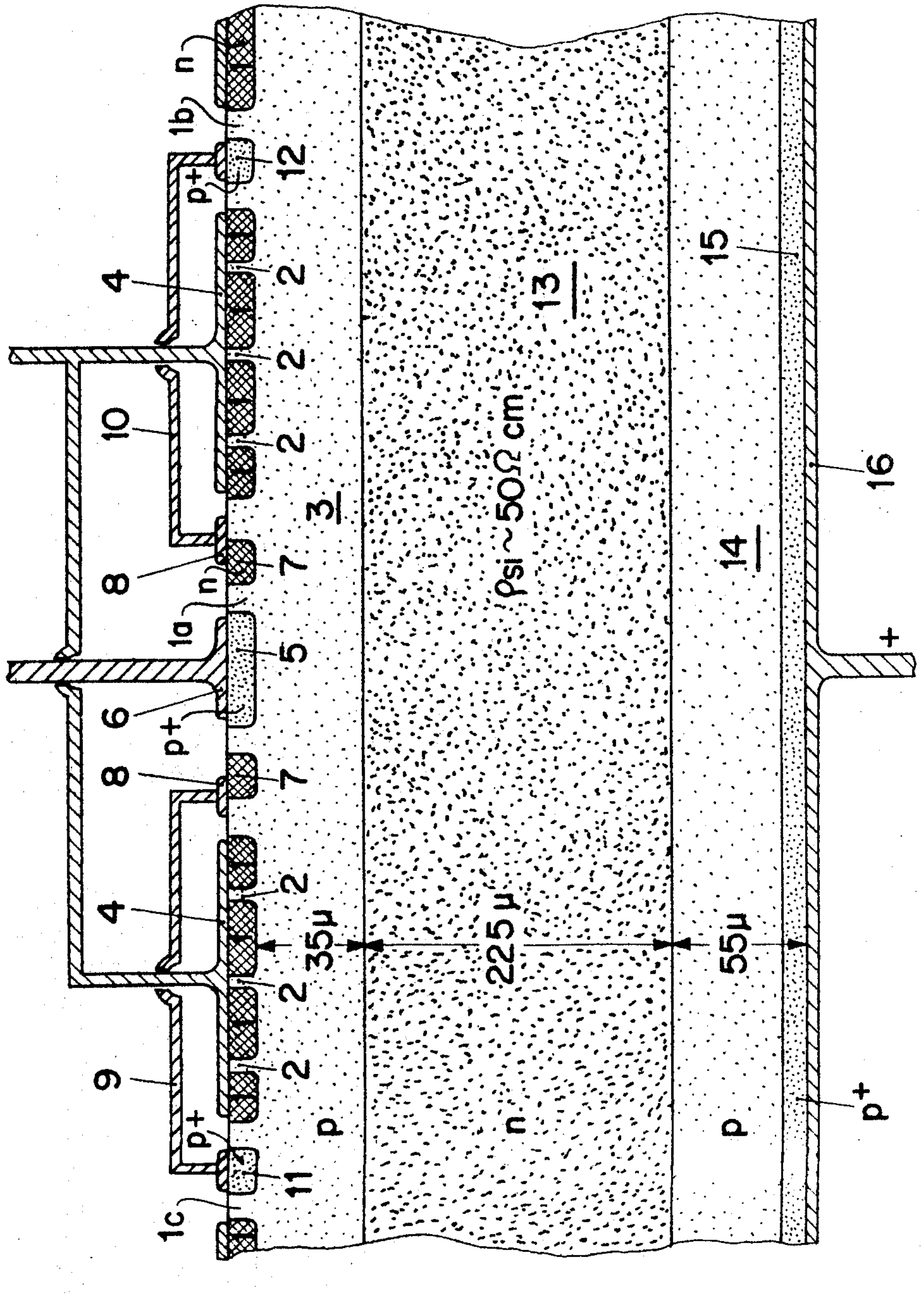

THYRISTOR WITH AMPLIFIED FIRING CURRENT

The present invention relates to an improvement in a thyristor with an outer emitter layer provided with a main electrode and a base layer of opposite conductivity type disposed thereunder, wherein the emitter layer is provided with an opening through which contact is made over a small area to the base layer, and wherein inside this opening and around the small area contact there is an annular zone exhibiting the same conductivity type as the emitter zone.

It is known that when a thyristor fires, the speeds at which the current rises are limited by reason of the fact that the discharge inside a thyristor is propagated at a finite speed from the firing electrode. This results in turn-on losses, which can assume considerable values, especially at relatively high frequencies. Thyristors therefore cannot be operated at their full nominal power output at relatively high frequencies.

In order to increase the speed at which firing is propagated, it has become known to increase the area of the firing electrode or the length of the edge of the emitter. However, this has not been a success because considerably more firing current is required. It has therefore hitherto been usual to make firing electrodes small in area.

In order to accelerate the speed at which the discharge is propagated in the transverse direction in spite of the small area firing electrode, it has become known for that part of the emitter surface which adjoins the firing electrode to be connected by relatively high resistance to the emitter terminal. This causes firing to be attended by a voltage drop in the transverse direction which accelerates the propagation of firing. This solution is also called the "transverse-field emitter". This "transverse-field emitter" has already been improved by the provision of further firing electrodes linked to the edge of the transverse-field emitter. The voltage drop across the transverse-field emitter thus supplied the firing voltage for the further firing electrodes.

The disadvantage of this solution resides in that the additional firing electrodes are turned on only after a certain delay of a few microseconds, so that during the first few microseconds after switching on, in which the main switching losses occur, the current densities, loss densities, etc. are precisely as great as in the case of a normal thyristor with a transverse-field emitter.

It is furthermore known to integrate an auxiliary thyristor into the power thyristor itself. In this case, the cathode of the auxiliary thyristor takes over the role of the firing electrode for the power thyristor, while the firing current to be supplied is determined in accordance with the firing current requirement of the auxiliary thyristor. This solution has also become known in the technical literature as the "amplifying gate". The main advantage of this solution lies less in the increase in the speed at which firing is propagated than in the reduction in firing current requirement.

The speed at which firing is propagated can be really increased if success is attained in firing the thyristor at a plurality of points simultaneously, and the object of the present invention is to provide a way of doing this. The same effect could also be attained with large-area firing electrodes, but this is prohibitive as already stated because of the excessive requirement for control current.

The invention proceeds from a thyristor with a so-called "amplifying gate". It is made in the form of a thyristor with an outer emitter layer provided with a main electrode and a base layer of opposite conductivity type disposed thereunder, wherein the emitter layer is provided with an opening through which contact is made over a small area to the base layer, and wherein inside this opening and around the small-area contact there is an annular zone of the same conductivity type as the emitter layer. The invention is characterized in that the emitter layer is provided with at least one additional opening through which additional small area contact is made to the base layer, and in that the annular zone and the additional small-area contact are linked to one another by a conductor without an intermediate barrier layer.

The annular zone constitutes, with the surrounding semi-conductor structure, an auxiliary thyristor which then supplies firing current to the additional small-area contacts on the base zone, so that the thyristor starts to fire practically simultaneously at a plurality of points. The consequence is a considerable increase in the speed at which firing is propagated, so that turn-on losses are greatly reduced. This is especially noticeable at relatively high frequencies. The control equipment for a thyristor according to the invention need supply only the firing current for the small auxiliary thyristor, while the firing current for the additional contacts on the base layer is taken from the main current-carrying circuit. However, this means that the turn-on of the additional contacts of the base layer occurs in proportion to the speed at which the current rises in the main current carrying circuit, so that extremely high di/dt values may be permitted without any danger to the thyristor.

The geometry of the additional contacts which act as firing electrodes is not important. It is even possible to choose geometries which have not hitherto been used on account of the excessive firing current requirement. It is advantageous to make the additional contacts annular, or to provide a plurality of small-area circular contacts.

It is furthermore advantageous for the annular zone which is of the same conductivity type as the emitter zone to be linked at its outer edge by means of a metal electrode to the contiguous region of the base layer. This gives the auxiliary thyristor all the advantages of the so-called "short emitter".

The invention is to be described in detail hereinafter in conjunction with the accompanying drawing, the single FIGURE of which illustrates a central section through a thyristor according to the invention.

The thyristor illustrated as an example of embodiment has an NPNP structure. The upper *n*-doped layer 1 serves as the emitter. It is provided in known manner with apertures 2 through which the *p*-doped base layer 3 disposed thereunder projects as far as the metal main electrode 4, so that the known "shorted emitter" results.

The emitter layer 1 comprises a control opening la through which contact is made with the base layer 3 by way of a small-area $p^+$-doped contact 5 together with a metal electrode 6. This is the firing or gating electrode. Around this small-area contact 5 and inside the opening la there is an annular zone 7, which just like the emitter layer 1 is n-doped and acts as the emitter of an auxiliary thyristor. Part of the annular zone 7 is linked to the contiguous region of the base layer 3 inside the opening la by means of a metal electrode 8, so that here also a shorted emitter junction is also electrically formed. The metal electrode 8 is linked by conductors 9 and 10 to auxiliary small-area $p^+$-doped contacts 11 and 12, which are formed respectively within the base layer 3 at additional openings lb, lc provided in the emitter layer 1. These auxiliary small-area contacts 11 and 12 located laterally outward of the control opening la and which are thus linked to the annular zone 7 via a conductor 9,10 without an intermediate boundary layer serve as auxiliary firing electrodes.

The remaining construction of the thyristor according to the invention is of the usual kind. The base layer 3 is followed by an n-doped layer 13, which is in turn succeeded b a p-doped layer 14. The second main electrode 16 is fitted to the thyristor by way of a $p^+$-doped layer 15.

If a firing pulse is fed via the conductor 6 to the contact 5, a current carrying channel is first formed going outward from the annular zone 7. This produces a voltage drop between the annular zone 7 and the cathode, depending as is known on the di/dt value in the main current (i) carrying circuit in such a manner that higher firing powers can be offered to the auxiliary contacts 11 and 12 as the di/dt values increase. As a result, firing can take place even more quickly, so that the thyristor according to the invention protects itself from breakdowns up to very high di/dt values.

The particularly high firing speeds which can be attained with a thyristor according to the invention also makes its turn-on losses lower than in the case of thyristors of the known form of construction, so that it can be especially well used as a frequency-thyristor. How the short turn-off times which are then necessary can be achieved is not the subject of this invention.

It may frequently be advantageous for the firing power which can be taken from the annular zone 7 not only to be fed to the auxiliary contacts 11 and 12, but also to be used elsewhere. The electrode 8 and the conductors 9 and 10 will then conveniently be linked to a separate connection on the complete thyristor. This has not been illustrated for the sake of clarity. This is always advantageous when any kind of control actions dependent on the di/dt value in the main current carrying circuit have to be carried out. It cannot be done by using a separate thyristor to amplify the firing pulse originally fed to conductor 6.

Thus, the voltage which appears across the thyristor according to the invention upon firing collapses substantially more quickly than in the case of known thyristors, so that turn-on losses are considerably reduced. It follows from this that the permissible power-dissipation depends substantially less on frequency than in the case of known thyristors. The firing power requirement is nevertheless not increased. Finally, a thyristor according to the invention protects itself from very high di/dt values, since the auxiliary contacts are turned on in dependence on the di/dt values in the main current-carrying circuit.

A thyristor according to the invention may be produced in accordance with known processes. The various layers may be diffused using masking methods, and the conductors 9 and 10 may be vapour coated onto protective strips of silicon dioxide. Aluminum or other metal may, for example, be used for this purpose. The silicon dioxide may also be applied by vapour-coating.

We claim:

1. A semiconductor device of the thyristor type comprising a body of semiconductive material having first, second and third superposed doped semiconductor layers which alternate in their type of semiconductivity, said second layer which is disposed between said first and third layers being of a first type of semiconductivity and said first and third layers being of a second type of semiconductivity, an emitter layer formed centrally within the top surface of said first layer and which has said first type of semiconductivity so as to establish a p-n junction therebetween, a first main electrode establishing contact with said emitter layer, said emitter layer also being provided with a central opening within which a gating electrode is connected to a highly doped central zone of said first layer, an annular zone formed in the top surface of said first layer concentrically within said central opening in said emitter layer and surrounding said gating electrode, said annular zone having said first type of semiconductivity so as to establish a p-n junction therebetween, an electrical contact member in contact with and linking an edge portion only of said annular zone with a contiguous portion of the top surface of said first layer to establish an auxiliary shorted emitter, said emitter layer being provided also with at least one additional opening establishing a corresponding zone of said first layer within which is provided a small area highly doped contact zone of the same type semiconductivity as said first layer and which serves as an auxiliary gating electrode, an electrical conductor directly connecting said annular zone with said small area contact zone, and a second main electrode establishing contact with a highly doped surface region of said third layer.

2. A semiconductor device as defined in claim 1 wherein said additional opening provided in said emitter layer is of annular form within which are established small area highly doped contact zones.

3. A semiconductor device as defined in claim 1 wherein a plurality of separate openings are provided in said emitter layer within each of which is established a small area highly doped contact zone.

4. A semiconductor device as defined in claim 1 wherein said emitter layer is also provided with small-area shorting apertures through which said first layer projects as far as said first main electrode.

* * * * *